(12) United States Patent  
Cypher et al.

(10) Patent No.: US 7,757,044 B2  
(45) Date of Patent: *Jul. 13, 2010

(54) FACILITATING STORE REORDERING THROUGH CACHELINE MARKING

(75) Inventors: Robert E. Cypher, Saratoga, CA (US); Shailender Chaudhry, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 740 days.

This patent is subject to a terminal disclaimer.

(21) Appl. No.: 11/591,223

(22) Filed: Oct. 31, 2006

(65) Prior Publication Data

US 2008/0104326 A1 May 1, 2008

(51) Int. Cl.
  G06F 12/00 (2006.01)
  G06F 13/00 (2006.01)
(52) U.S. Cl. .................................................... 711/118
(58) Field of Classification Search .................. 711/118
  See application file for complete search history.

(56) References Cited

U.S. PATENT DOCUMENTS 5,577,200 A * 11/1996 Abramson et al. ............ 714/50
5,761,712 A * 6/1998 Tran et al. ................... 711/126
7,269,717 B2 * 9/2007 Tremblay et al. ........... 712/218
7,389,383 B2 * 6/2008 Tremblay et al. ........... 711/118
2004/0162951 A1 * 8/2004 Jacobson et al. ............ 711/143
2004/0162967 A1 * 8/2004 Tremblay et al. ........... 712/228
2004/0187123 A1 * 9/2004 Tremblay et al. ........... 718/100
2005/0262301 A1 * 11/2005 Jacobson et al. ............ 711/118

* cited by examiner

*Primary Examiner*—Mardochee Chery  
(74) *Attorney, Agent, or Firm*—Park, Vaughan & Fleming LLP

(57) ABSTRACT

One embodiment of the present invention provides a system that facilitates store reordering through cacheline marking. During operation, the system receives a memory operation which is directed to a cacheline. Next, the system determines whether a thread which is performing the memory operation has set a store-mark for the cacheline. If the thread has set the store-mark for the cacheline, the system performs the memory operation. Otherwise, the system determines if the cacheline has been store-marked by another thread. If so, the system delays the memory operation. On the other hand, if the cacheline has not been store-marked by another thread, the system performs the memory operation.

26 Claims, 3 Drawing Sheets

FACILITATING STORE REORDERING THROUGH CACHELINE MARKING

RELATED APPLICATION

The subject matter of this application is related to the subject matter in a co-pending non-provisional application by the same inventors as the instant application entitled, "Facilitating Load Reordering Through Cacheline Marking" having Ser. No. 11/591,225, and filing date Oct. 31, 2006

BACKGROUND

1. Field of the Invention

The present invention relates to the design of processors within computer systems. More specifically, the present invention relates to a technique that facilitates reordering store instructions through cacheline marking.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help reduce the number of memory accesses that are performed. However, when a memory reference, such as a load, generates a cache miss, the subsequent access to level-two (L2) cache or memory can require dozens or hundreds of clock cycles to complete, during which time the processor is typically idle, performing no useful work.

In contrast, cache misses during stores typically do not affect processor performance as much because the processor usually places the stores into a "store queue" and continues executing subsequent instructions. Existing store queue designs typically maintain an array of pending stores in program order. Note that some of these pending stores are directed to a same word in a same cacheline. In particular, if consecutive stores are directed to a same word, these stores can be effectively merged into a single entry in the store queue without violating a conventional memory model, such as the Total-Store-Order (TSO) memory model. This merging can effectively reduce the memory bandwidth because the number of memory accesses is reduced.

However, when "non-consecutive" stores (that is, stores that are separated, in program order, by one or more stores by the same thread to a different word) directed to a same word are pending in a store queue, these non-consecutive stores to the same word typically cannot be merged without violating a conventional memory model, such as TSO. TSO is violated because merging non-consecutive stores effectively reorders the stores with respect to other intervening memory accesses.

This inability to reorder stores also gives rise to other performance problems. For example, non-consecutive stores to the same cacheline cannot be reordered and hence cannot be combined to reduce traffic to memory.

Furthermore, the inability to reorder stores may force the store queue to maintain ordering information between all stores that it contains, thus complicating its design.

Hence, what is needed is a method and apparatus that facilitates reordering stores to overcome the above-described problems.

SUMMARY

One embodiment of the present invention provides a system that facilitates store reordering through cacheline marking. During operation, the system receives a memory operation which is directed to a cacheline. Next, the system determines whether a thread which is performing the memory operation has set a store-mark for the cacheline. If the thread has set the store-mark for the cacheline, the system performs the memory operation. Otherwise, the system determines if the cacheline has been store-marked by another thread. If so, the system delays the memory operation. On the other hand, if the cacheline has not been store-marked by another thread, the system performs the memory operation.

In a variation on this embodiment, the system determines whether the thread has set the store-mark by checking a private buffer associated with the thread.

In a variation on this embodiment, the system determines whether the thread has set the store-mark by checking the store-mark on the cacheline to determine if it has been set by the thread.

In a variation on this embodiment, the memory operation can include: a load operation directed to the cacheline or a store operation directed to the cacheline.

In a further variation on this embodiment, the private buffer for the thread maintains the addresses of cachelines whose store-marks have been set by the thread.

In a further variation, the system determines whether the store-mark for the cacheline has been set by the thread by checking the private buffer to see if the address of the cacheline exists in the private buffer.

In a variation on this embodiment, the system determines if the cacheline has been store-marked by another thread by: checking a store-mark in a copy of the cacheline in a local cache to see if the store-mark has been set. If there is no valid copy of the cacheline in the local cache, the system uses a cache-coherency mechanism to determine if the store-mark has been set in a copy of the cacheline in another cache or in memory.

In a further variation, using the cache-coherence mechanism involves: sending a cache-coherence signal to other caches and/or memory to determine whether a copy of the cacheline has been store-marked by another thread; and receiving a NACK signal if another copy of the cacheline has been store-marked by another thread.

In a variation on this embodiment, if the cacheline has not been store-marked and if the memory operation is a store operation, the system enqueues the store operation in a store queue. The system also store-marks the cacheline and adds a corresponding entry to the private buffer for the thread which includes the address of the cacheline.

In a variation on this embodiment, the system reorders stores directed to a set of cachelines which are store-marked by the thread.

In a further variation, the system reorders the stores by merging consecutive and non-consecutive stores which are directed to a same cacheline.

In a further variation, the system merges the stores directed to the same cacheline by ensuring that each byte in the cacheline that is written to by at least one of the stores ultimately contains the value of the last store to the byte in program order.

In a further variation, the stores that are reordered appear to other threads to have been performed in program order.

In a further variation on this embodiment, the system releases a store-marked cacheline by unsetting the store-mark in a copy of the cacheline in a local cache. The system also removes the address of the cacheline from the private buffer.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

One embodiment of the present invention provides a memory system which allows stores from a thread to be reordered. To accomplish this without violating a memory model such as TSO, the present invention adds a store-mark to cachelines that are stored to, wherein the store-mark can be propagated to all levels of the memory hierarchy, including all caches and main memory. In addition, each thread maintains a private buffer which keeps track of the addresses of all cachelines for which the thread has set the store-mark. When a particular cacheline is store-marked by a thread, that thread obtains exclusive access to the cacheline through a cache-coherence mechanism. Because no other thread can access the cacheline while the thread's store-mark is set, both consecutive and non-consecutive stores to the same word in the cacheline can be merged into a single entry in a store queue for the thread. Furthermore, stores directed to a same store-marked cacheline can also be merged into a single store to the memory hierarchy to reduce memory bandwidth.

The present invention is described in more detail below, but first we describe how the store queue fits into a computer system.

Computer System

Figure 1:
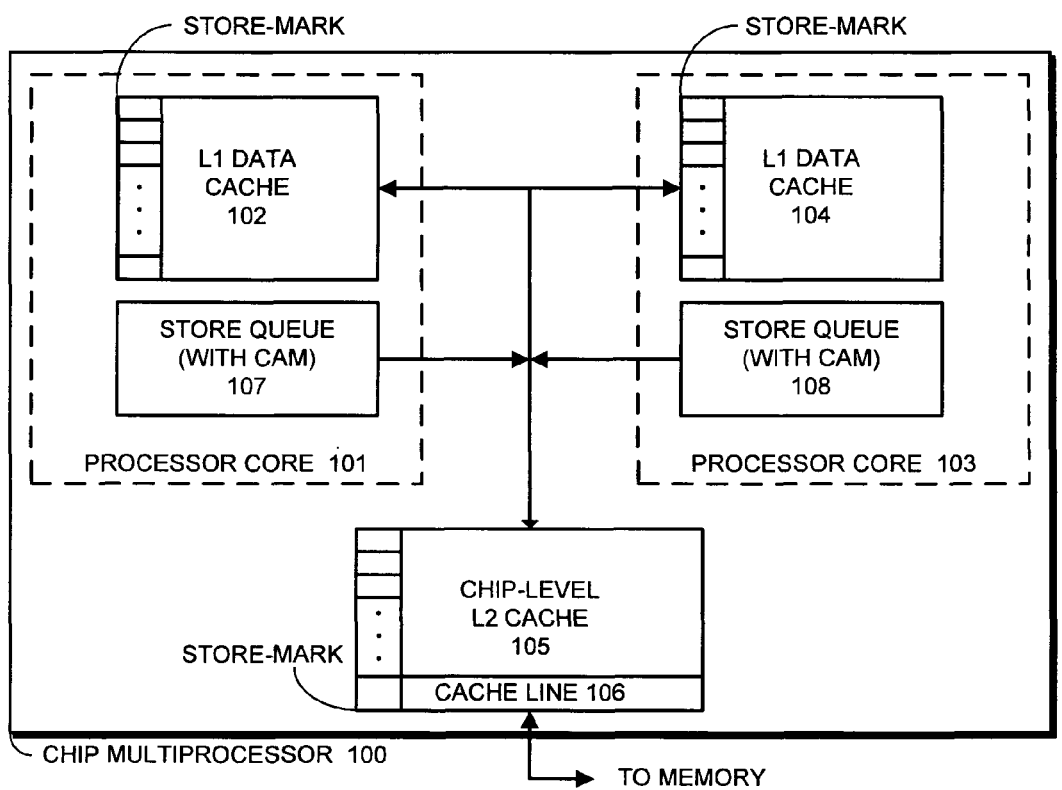
FIG. 1 illustrates an exemplary Chip Multi-Processor (CMP) system in accordance with an embodiment of the present invention.

FIG. 1 illustrates an exemplary Chip Multi-Processor (CMP) system 100 in accordance with an embodiment of the present invention. CMP system 100 is incorporated onto a single semiconductor die, and includes two processor cores, 101 and 103.

Processor cores 101 and 103 include L1 data caches 102 and 104, respectively, and they share L2 cache 105. Along with L1 data caches 102 and 104, processor cores 101 and 103 include store queues 107 and 108, which buffer pending store operations.

During a store operation in processor core 101, processor core 101 first performs a lookup for a corresponding cacheline in L1 data cache 102. If the lookup generates a miss in L1 data cache 102, processor core 101 creates an entry for the store in store queue 107 and sends a corresponding fetch for the store to L2 cache 105.

During a subsequent load operation, processor core 101 uses a CAM structure to perform a lookup in store queue 107 to locate completed but not-yet-retired stores to the same address that are logically earlier in program order. For each byte being read by the load operation, if such a matching store exists, the load operation obtains its value from store queue 107 rather than from the memory subsystem.

Note that each cacheline in L1 data cache 102, L1 data cache 104, L2 cache 105, as well as in the memory (not shown) can include a store-mark. This store-mark can be used to prevent conflicting memory references from taking place. We discuss how the store-mark is used in more detail below.

Performing Memory Operations to a Store-Marked Cacheline

One embodiment of the present invention can set a store-mark in each cacheline in all levels of the memory hierarchy, including all caches (L1 caches 102 and 104, L2 cache 105 in FIG. 1) and main memory, wherein the store-mark can occupy a single bit or multiple bits.

Each store-mark can have two states: (1) set and (2) clear, which are controlled by active threads of the computer system. When a store-mark for a cacheline is set, the cacheline is effectively locked by the thread which set the store-mark, and is hence not available to other threads. We will use the term "store-marked" to refer to the "set" state of a store-mark.

When a particular cacheline is store-marked by a thread, the thread obtains exclusive access to the cacheline. On the other hand, when the store-mark for the cacheline is clear, the cacheline is typically available to be accessed by memory references from any thread (we will discuss an exceptional case associated with cache-coherence below). The store-mark for a cacheline is visible to all threads, so that it can be used by a thread to determine whether the cacheline can be accessed.

Because the memory system treats store-marked cachelines as though they are locked, other threads that request a store-marked cacheline must wait until the cacheline is no longer store-marked before they can access the cacheline. In one embodiment of the present invention, a thread attempting to access a store-marked cacheline receives a NACK signal indicating that it must retry the load or store. In the case of a load, the load could be treated as if it missed in the cache, thereby causing the load to be deferred.

In one embodiment of the present invention, each thread maintains a private buffer containing addresses for cachelines which have been store-marked by the thread. Hence, whenever a thread needs to load or store to a cacheline, that thread first checks its private buffer to see if it has already set the store-mark for the cacheline. In one embodiment of the present invention, this private buffer can be implemented as an SRAM-based CAM. For a detailed SRAM-based CAM, see U.S. patent application Ser. No. 11/495,852 entitled, "Content-Addressable Memory that Supports a Priority Ordering Between Banks," by inventor Robert E. Cypher.

In one embodiment of the present invention, each store queue entry is used to hold uncommitted stores associated with a particular thread. Some of these stores may be directed to a cacheline which has been store-marked by the thread. In this case, because no other threads can access the cacheline, the stores (whether they be consecutive stores or non-consecutive stores) can be sequentially merged into a corresponding store queue entry. We discuss store merging in more detail below.

Figure 2:
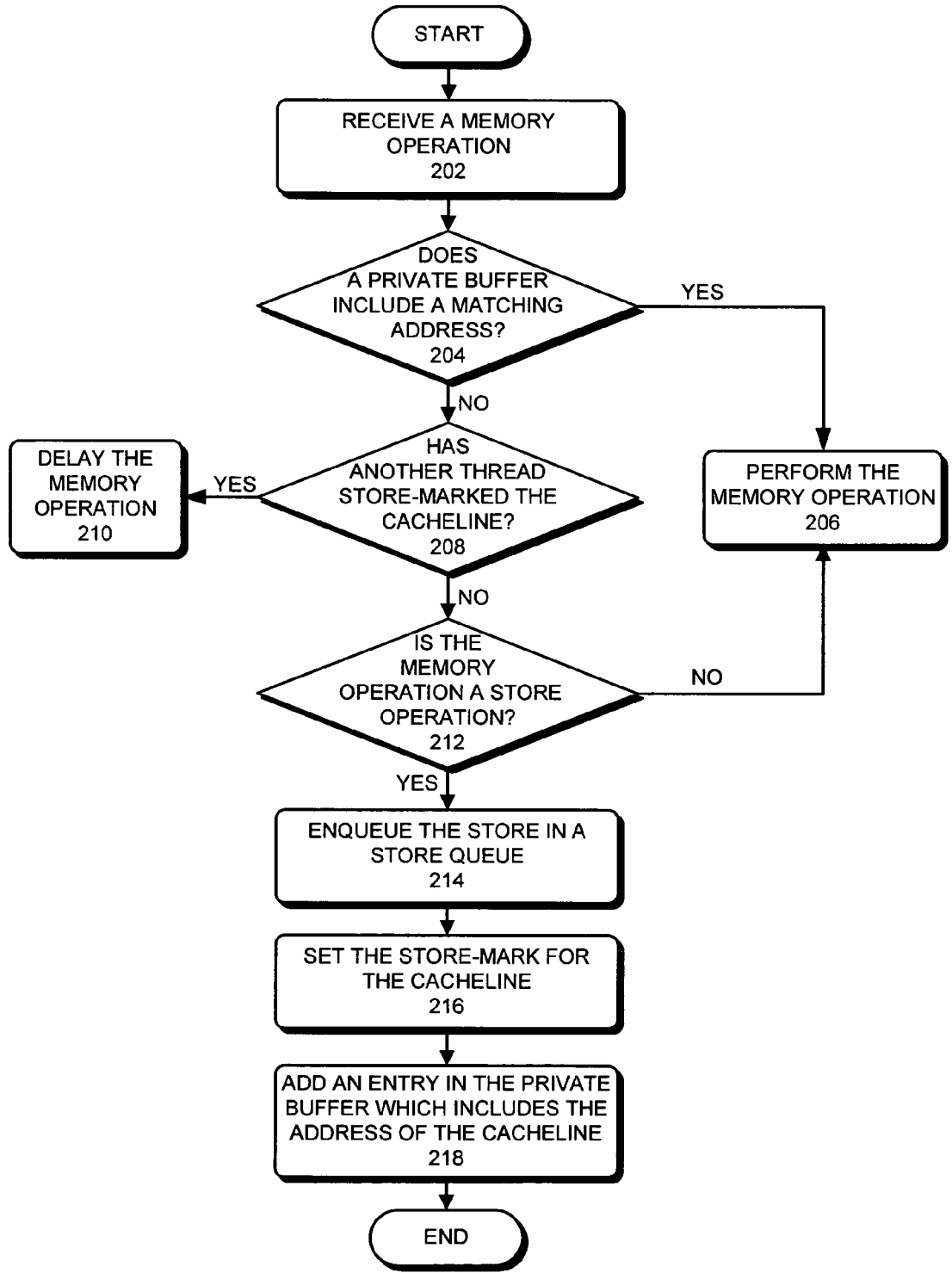
FIG. 2 presents a flowchart illustrating the process of performing a memory operation, such as a load or a store, in accordance with an embodiment of the present invention.

FIG. 2 presents a flowchart illustrating the process of performing a memory operation, such as a load or a store, in accordance with an embodiment of the present invention.

The system first receives a memory operation for a thread which is directed to a cacheline (step 202).

Next, the system checks a private buffer for the thread, which keeps track of addresses for store-marked cachelines, to determine whether a store-mark for the cacheline has been set by the thread (step 204). Specifically, the system performs a lookup in the thread's private buffer based on the address of the memory reference to locate a matching address for a store-marked cacheline. Note that the private buffer can be structured as a CAM, which facilitates lookups based on addresses.

If the private buffer contains a matching address, the thread knows that it has already set the store-mark for the cacheline, and can proceed with the memory operation (step 206).

If, however, the private buffer does not contain a matching address, the thread concludes that it has not set the store-mark. The thread subsequently determines (using the process below) whether the cacheline has been store-marked by another thread (step 208), and if so, the memory operation is delayed (step 210).

Figure 3:
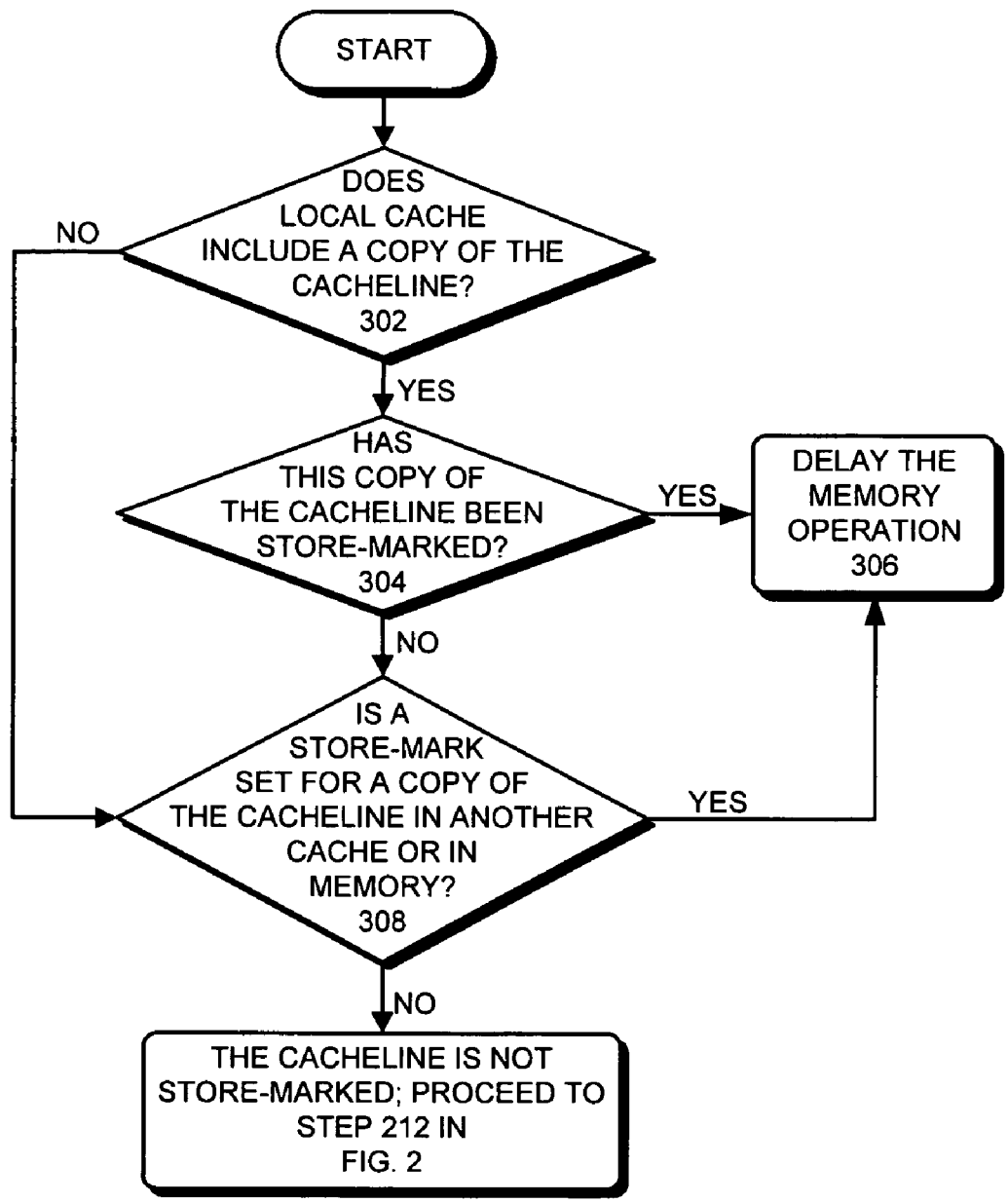
FIG. 3 presents a flowchart illustrating the process of determining whether the cacheline has been store-marked by another thread in accordance with an embodiment of the present invention.

FIG. 3 presents a flowchart illustrating the process of determining whether the cacheline has been store-marked by another thread in accordance with an embodiment of the present invention. During this process, the thread first checks in its local cache for a copy of the cacheline (step 302). If the thread finds a copy of the cacheline, it examines the store-mark to determine whether the cacheline has been store-marked by another thread (step 304). If so, the memory operation is delayed (step 306).

If the store-mark in the copy of the cacheline is not set, the system determines whether the store-mark has been set in another copy of the cacheline which exists in another cache or in memory (step 308). If so, the memory operation is delayed (step 306).

In step 308, note that the system can use a cache-coherence mechanism to determine whether another cache or the memory holds a store-marked copy of the cacheline. This can involve sending an exclusive access request for the cacheline to the other caches. If the cacheline has been store-marked in another cache, the system will receive a NACK signal from the other cache which causes the request to fail, in which case the memory operation can be retried. If, however, the system does not receive a NACK signal, it can then obtain exclusive (writable) access to that cacheline.

Referring back to step 206 of FIG. 2, note that in order to perform the memory operation, it may be necessary to use the cache coherence protocol to obtain a copy of the cacheline in a suitable state in the local cache. For example, if the memory operation is a load, it may be necessary to obtain a copy of the cacheline in the shared (S), exclusive (E), owned (O), or modified (M) state. Similarly, if the memory operation is a store, it may be necessary to obtain a copy of the cacheline in the E or M state (and if it is in the E state, it may be necessary to change it to the M state upon performing the store). Note that if the cache coherence protocol is used to obtain a copy of the cacheline in the E or M state, the request for this copy may differ from the exclusive access request mentioned in the description of step 308 of FIG. 3. This is because in step 206 the thread performing the store has already placed a store mark on the cacheline, and thus the request should not receive a NACK signal.

Referring back to step 212 of FIG. 2, when the thread obtains exclusive access to the cacheline, it next determines whether the memory operation is a store operation. If so, the thread enqueues the store operation in a store queue (step 214). The thread then sets the store-mark for the cacheline (step 216) and subsequently adds a corresponding entry to the private buffer to include the address of the cacheline (step 218). Note that this entry will remain in the private buffer until subsequent changes are made to the state of the cacheline, such as removing the store-mark.

In one embodiment of the present invention, when a thread performs one or more stores to the store-marked cacheline, the last of the stores can include a flag indicating that the store-mark should be cleared. When such a flag is encountered, the system releases the store-marked cacheline by unsetting the store-mark in a copy of the cacheline in its local cache, and additionally removing the address of the cacheline from its private buffer.

In one embodiment of the present invention, once a thread has placed a store-mark on a cacheline, all valid copies of that cacheline in any of the caches and in memory must contain that store-mark. As a result, if a copy of a cacheline with a store-mark is replaced from a cache and if this replacement makes the copy of the cacheline in memory valid, it is necessary to ensure that the copy in memory also contains the store-mark. This could be accomplished by writing back the store-mark to memory when the cacheline is replaced from the cache.

While the above description has assumed a store-mark that has only 2 values, namely set and unset, alternate implementations are possible. For example, it is possible to use a store-mark that is either set or unset, and if it is set, it records the identity of the thread that sets it. Note that when such a store-mark is used, in step 204 it is not necessary to check the private buffer to determine if the thread attempting to perform the memory access has placed a store-mark on the cacheline. Instead, it is possible to check the store-mark on the cacheline to make this determination. Also, note that if the store-mark includes the identity of the thread that placed it, the cache coherence requests for exclusive access in steps 206 and 308 can be identical, provided they include the identity of the thread performing the request.

Note that it is possible for a thread to place store-marks on cachelines prior to performing certain stores and to not place store-marks on cachelines prior to making other stores. For example, a thread may reorder some stores and not reorder other stores, in which case it may not place store-marks on some or all of the stores that it does not reorder.

Applications of Cacheline Store-Marking

Merging Stores Directed to the Same Word

As mentioned previously, consecutive stores directed to the same word in a cacheline can be merged into a single entry in the store queue without violating the TSO memory model.

In addition, store marks can be used to enable non-consecutive stores directed to a same word to be merged into a single entry in the store queue. This store merging can be accomplished by merging the bytes that are updated by the younger store into the corresponding word in the store queue which has been updated by older stores. It also involves updating corresponding byte mask bits by logically OR-ing the byte masks of the merged stores. Because the thread has exclusive access to the store-marked cacheline, this merging is not visible to other threads, and hence will not cause memory model violations. Furthermore, because the stores are merged into one entry in the store queue, only one store queue entry needs to be applied to the memory.

Merging Stores Directed to the Same Cacheline

In addition to allowing stores directed to the same word to be merged in the store queue, store-marking also allows non-consecutive stores directed to the same cacheline to be merged before the cacheline is propagated to the memory hierarchy. The stores can generally be merged in any order, except that when stores overlap on a byte, the system must ensure that the byte ultimately contains the value of the last store to the byte in the program order.

Note that the merged cacheline contains the cumulative result of the multiple stores. This allows a single merged store operation to be propagated to the memory hierarchy instead of multiple separate store operations. This reduces bandwidth to memory.

In one embodiment of the present invention, the act of propagating a store operation to the memory subsystem also clears the store-mark for the cacheline.

Reordering Stores to Store-Marked Cachelines

Another benefit of store-marking cachelines is that it allows a set of stores to be propagated from the store buffer into the memory hierarchy in arbitrary order, provided that the set of stores are all store-marked simultaneously. If a set of cachelines are all store-marked simultaneously at a single point in time, they all appear to have been stored to at the single point in time, and in program order, from the perspective of other threads. This ensures that the TSO memory model is not violated.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating store reordering through cacheline marking, the method comprising:
   receiving a memory operation to be executed;
   determining whether a thread which is performing the memory operation has set a store-mark for a cacheline associated with the memory operation, wherein the thread is one thread in a set of threads, wherein each thread in the set of threads maintains a private cacheline-address buffer which contains addresses for cachelines which have been store-marked by the thread;
   if the thread has set a store-mark for the cacheline, performing the memory operation; and
   if the thread has not set a store-mark for the cacheline, determining if the cacheline has been store-marked by another thread;
      if the cacheline has been store-marked by another thread, delaying the memory operation; and
      if the cacheline has not been store-marked by another thread, performing the memory operation.

2. The method of claim 1, wherein determining whether the thread has set the store-mark involves checking a private cacheline-address buffer associated with the thread.

3. The method of claim 2, wherein determining whether the thread has set the store-mark for the cacheline involves checking the private cacheline-address buffer to see if the address of the cacheline exists in the private cacheline-address buffer.

4. The method of claim 2, wherein the method further comprises:
   releasing a store-marked cacheline by unsetting the store-mark in a copy of the cacheline in a local cache; and
   removing the address of the cacheline from the private cacheline-address buffer.

5. The method of claim 1, wherein determining whether the thread has set the store-mark involves checking the store-mark on the cacheline to determine if it has been set by the thread.

6. The method of claim 1, wherein the memory operation can include:
   a load operation; or
   a store operation.

7. The method of claim 1, wherein determining if the cacheline has been store-marked by another thread involves:
   checking a store-mark in a copy of the cacheline in a local cache to see if the store-mark has been set; and
   if there is no valid copy of the cacheline in the local cache, using a cache-coherency mechanism to determine if the store-mark has been set in a copy of the cacheline in another cache or in memory.

8. The method of claim 7, wherein using the cache-coherence mechanism to determine if the store-mark has been set by another thread involves:
   sending a cache-coherence signal to other caches and/or the memory to determine whether a copy of the cacheline has been store-marked by another thread; and
   if another copy of the cacheline has been store-marked by another thread, receiving a NACK signal.

9. The method of claim 2, wherein if the cacheline has not been store-marked and if the memory operation is a store operation, the method further comprises:
   enqueuing the store operation in a store queue;
   store-marking the cacheline; and
   adding a corresponding entry to the private cacheline-address buffer for the thread which includes the address of the cacheline.

10. The method of claim 1, wherein the method further comprises reordering stores directed to a set of cachelines which are store-marked by the thread.

11. The method of claim 10, wherein reordering the stores involves merging consecutive and non-consecutive stores which are directed to a same cacheline.

12. The method of claim 11, wherein merging the stores directed to the same cacheline involves ensuring that each byte in the cacheline that is written to by at least one of the stores ultimately contains value of the last store to the byte in program order.

13. The method of claim 10, wherein the stores that are reordered appear to other threads to have been performed in program order.

14. An apparatus that facilitates store reordering through cacheline marking, comprising:
   a receiving mechanism configured to receive a memory operation to be executed;
   a determination mechanism configured to determine whether a thread which is performing the memory operation has set a store-mark for a cacheline associated with the memory operation, wherein the thread is one thread in a set of threads, wherein each thread in the set of threads maintains a private cacheline-address buffer which contains addresses for cachelines which have been store-marked by the thread;
   an execution mechanism configured to perform the memory operation if the thread has set a store-mark for the cacheline;

wherein if the thread has not set a store-mark for the cacheline, the determination mechanism is configured to determine if the cacheline has been store-marked by another thread;

a delay mechanism configured to delay the memory operation if the cacheline has been store-marked by another thread; and wherein the execution mechanism is configured to perform the memory operation if the cacheline has not been store-marked by another thread.

15. The apparatus of claim 14, wherein the determination mechanism is configured to check a private cacheline-address buffer associated with the thread.

16. The apparatus of claim 15, wherein the private cacheline-address buffer for the thread maintains addresses of cachelines whose store-marks have been set by the thread.

17. The apparatus of claim 16, wherein while determining whether the thread has set the store-mark for the cacheline, the determination mechanism is configured to check the private cacheline-address buffer to see if the address of the cacheline exists in the private cacheline-address buffer.

18. The apparatus of claim 15, further comprising a release mechanism configured to:

release a store-marked cacheline by unsetting the store-mark in a copy of the cacheline in a local cache; and to remove the address of the cacheline from the private cacheline-address buffer.

19. The apparatus of claim 14, wherein the determination mechanism is configured to check the store-mark on the cacheline to determine if it has been set by the thread.

20. The apparatus of claim 14, wherein the memory operation can include:

a load operation; or a store operation.

21. The apparatus of claim 14, wherein the determination mechanism is further configured to:

check a store-mark in a copy of the cacheline in a local cache to see if the store-mark has been set; and to use a cache-coherency mechanism to determine if the store-mark has been set in a copy of the cacheline in another cache or in memory, if there is no valid copy of the cacheline in the local cache.

22. The apparatus of claim 21, wherein the cache-coherency mechanism is configured to:

send a cache-coherence signal to other caches and/or the memory to determine whether a copy of the cacheline has been store-marked by another thread; and to receive a NACK signal if another copy of the cacheline has been store-marked by another thread.

23. The apparatus of claim 15, further comprising a store-marking mechanism which is configured to:

enqueue the store operation in a store queue;

store-mark the cacheline; and to add a corresponding entry to the private cacheline-address buffer for the thread which includes the address of the cacheline.

24. The apparatus of claim 14, further comprising a memory updating mechanism which is configured to reorder stores which are associated with store-marked cachelines while the stores are being committed to memory.

25. The apparatus of claim 14, further comprising a merging mechanism configured to merge consecutive and non-consecutive stores which are directed to the cacheline which has been store-marked.

26. A computer system that facilitates store reordering through cacheline marking, comprising:

a processor;

a memory;

a receiving mechanism configured to receive a memory operation to be executed;

a determination mechanism configured to determine whether a thread which is performing the memory operation has set a store-mark for a cacheline associated with the memory operation, wherein the thread is one thread in a set of threads, wherein each thread in the set of threads maintains a private cacheline-address buffer which contains addresses for cachelines which have been store-marked by the thread;

an execution mechanism configured to perform the memory operation if the thread has set a store-mark for the cacheline;

wherein if the thread has not set a store-mark for the cacheline, the determination mechanism is configured to determine if the cacheline has been store-marked by another thread;

a delay mechanism configured to delay the memory operation if the cacheline has been store-marked by another thread; and wherein the execution mechanism is configured to perform the memory operation if the cacheline has not been store-marked by another thread.

* * * * *